United States Patent Office 3,330,841
Patented July 11, 1967

3,330,841
SUBSTITUTED 3 - (4 - CARBAMOYL - 2,3,5 - TRIHY-DROXY - BENZYL) - 1,2,3,4 - TETRAHYDRO - 4,8-DIHYDROXY - 1 - OXO - 2 - NAPHTHOIC ACID, γ-LACTONES
Joseph John Hlavka, Tuxedo, and Panayota Bitha, New York, N.Y., assignors to American Cyanamid Company, Stamford, Conn., a corporation of Maine
No Drawing. Filed Nov. 30, 1964, Ser. No. 414,902
12 Claims. (Cl. 260—347.3)

This invention relates to new organic compounds and, more particularly, is concerned with novel substituted 3 - (4 - carbamoyl - 2,3,5 - trihydroxybenzyl) - 1,2,3,4-tetrahydro-4,8-dihydroxy-1-oxo-2-naphthoic acid, γ-lactones and to methods of preparing these novel compounds. The novel γ-lactones of the present invention may be represented by the following general formula:

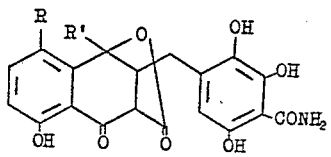

wherein R is hydrogen, chlorine, bromine or nitro and R' is hydrogen or methyl.

The novel compounds of the present invention are obtainable as crystalline materials having characteristic absorption spectra and high melting points. They are generally insoluble in water but soluble in most organic solvents.

The novel compounds of the present invention may be readily prepared by dissolving an appropriate tetracycline methyl betaine [J.A.C.S. 80, 1654–1657 (1958)] in methanol or acetonitrile and refluxing the resulting solution under an atmosphere of nitrogen for from 1 to 2 hours. After the reaction is complete, the solvent is removed by evaporation to dryness and the product is isolated.

The novel compounds of the present invention are useful as intermediates in the synthesis of physiologically active antibiotics of the tetracycline series. Initially, a substituted γ-lactone is converted to the corresponding 1,3,4,10,11,12 - hexahydroxynaphthacene - 2 - carboxamide either by refluxing in a 30% solution of hydrobromic acid in acetic acid or by dissolving in concentrated sulfuric acid at room temperature. Either procedure results in the conversion of the γ-lactone to the corresponding 1,3,4,10,11,12 - hexahydroxynaphthacene-2-carboxamide. The 1,3,4,10,11,12 - hexahydroxynaphthacene-2-carboxamides may then be biologically transformed to the tetracyclines as set forth in the following reaction scheme:

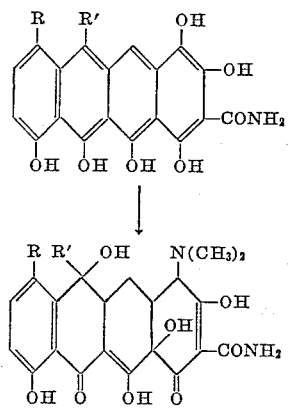

wherein R and R' are as previously defined. This transformation is accomplished by adding the 1,3,4,10,11,12 hexahydroxynaphthacene-2-carboxamide to a fermentation medium inoculated with a strain of a species of the genus Streptomyces which species is capable of producing one of the tetracyclines. Where R is hydrogen, and a non-halogenating strain of Streptomyces is employed, then R is also hydrogen in the product. Where R is hydrogen, and a 7-halogenating strain of the genus Streptomyces is employed, then R in the product is chlorine or bromine depending upon the conditions of the fermentation. Among the strains of S. aureofaciens which will introduce chlorine or bromine at the 7-position of the molecule, as well as accomplishing the 5a,6- and 4a,12a-dihydration and the introduction of the dimethylamino group at the 4-position, are the following:

S. aureofaciens

| | |
|---|---|
| ATCC 10762a | ATCC 12554 |
| ATCC 10762b | ATCC 13189 |
| ATCC 10762g | ATCC 13899 |
| ATCC 10762i | ATCC 13900 |
| ATCC 11989 | NRRL B–1286 |
| ATCC 12416b | NRRL B–1287 |
| ATCC 12416c | NRRL B–1288 |
| ATCC 12416d | NRRL B–2209 |
| ATCC 12551 | NRRL B–2406 |
| ATCC 12552 | NRRL B–2407 |
| ATCC 12553 | NRRL 3013 |

A representative strain of the genus Streptomyces which is a non-halogenating strain, that is, which will not introduce halogen in the 7-position of the molecule, but which will accomplish the 5a,6- and 4a,12a-dihydration and the introduction of the dimethylamino group at the 4-position, is S. aureofaciens NRRL 3014.

The conditions of the fermentation for the biological conversion of the 1,3,4,10,11,12 - hexahydroxynaphthacene-2-carboxamides to tetracyclines are generally the same as set forth in U.S. Patent 2,482,055 to Duggar, U.S. Patent 2,734,018 to Minieri et al. and U.S. Patent 2,878,289 to McCormick et al. and which, in turn, are generally the same as for the presently known methods for producing various tetracyclines by fermentation. That is, the fermentation medium contains the usual nutrients and mineral substances. Suitable nutrients include any assimilable source of carbon, such as the polysaccharides or starches, or polyalcohols such as glycerol may be used. An assimilable source of nitrogen may be supplied through the use of proteins, protein hydrolysates, urea, corn steep liquor, meat extracts, peptone, distillers solubles, fish meal and other conventional substances. The common anions and cations are supplied in the form of their non-toxic salts. Trace elements such as manganese, cobalt, zinc, copper, etc., are obtained either as impurities in the above compounds, or through the use of tap water or by specifically adding solutions especially enriched with these trace elements.

The other general conditions of the fermentation such as hydrogen ion concentration, temperature, time, rate of aeration, preparation of the inoculum, sterilization, inoculation and the like are conventional and are similar to those for the production of other tetracyclines as set forth in the aforementioned U.S. patents to Duggar, Minieri et al. and McCormick et al.

When a 7-halogenating strain of the genus Streptomyces is employed with a 1,3,4,10,11,12-hexahydroxynaphthacene-2-carboxamide wherein R is hydrogen, it is necessary only to modify the fermentation medium so that it contains at least 10 parts per million and preferably 1000–1500 parts per million of chloride ions when the 7-chloro substituent is desired, or a like amount of bromide ions when the 7-bromo substituent is desired.

After the fermentation has been continued for a suitable time, for example, from 12 to 96 hours, and the transformation of the 1,3,4,10,11,12-hexahydroxynaphthacene-2-carboxamide to the desired tetracycline is substantially complete, the tetracycline product may be isolated from the fermentation mash in any convenient manner. The isolation process may be selected from any of the numerous isolation techniques now well known in the art.

The 1,3,4,10,11,12-hexahydroxynaphthacene ‑ 2 ‑ carboxamide starting material may be added at any desired concentration, although for practical reasons a 1,3,4,10,11,12-hexahydroxynaphthacene-2-carboxamide substrate at a concentration of up to about 10 grams per liter of medium is satisfactory although higher concentrations may be used with some sacrifice in yield. The addition of the 1,3,4,10,11,12-hexahydroxynaphthacene ‑ 2 ‑ carboxamide starting material may be accomplished in any suitable manner so long as it promotes contact of the 1,3,4,10,11,12-hexahydroxynaphthacene-2-carboxamide with the biological medium. To this end, it is preferred to add the 1,3,4,10,11,12-hexahydroxynaphthacene ‑ 2 ‑ carboxamide starting material in a solvent such as dimethylformamide, dimethylacetamide, dimethylenesulfoxide, tetramethylenesulfoxide and N-methylpyrrolidone. However, dimethylsulfoxide is preferred and a solution of magnesium acetate in dimethylsulfoxide is the most preferred solvent for the 1,3,4,10,11,12-hexahydroxynaphthacene ‑ 2 ‑ carboxamide starting material. Solutions of the 1,3,4,10,11,12-hexahydroxynaphthacene-2-carboxamides must be protected from air as the compounds are readily oxidized in solution.

Since the novel 3-(4-carbamoyl-2,3,5-trihydroxybenzyl)-1,2,3,4-tetrahydro-4,8-dihydroxy-1-oxo-2 ‑ naphthoic acid, γ-lactones of the present invention are more stable to the acidic conditions demanded by electrophilic substitution, the substituents at the 5- and/or 7-positions thereof may be varied (i.e. Cl, Br, I, $NO_2$) and the resulting γ-lactone may be converted chemically to the corresponding 1,3,4,10,11,12 ‑ hexahydroxynaphthacene-2-carboxamide which in turn may be bioconverted to the corresponding tetracycline. The increased stability of these γ-lactones in acid is due to the fact that the tertiary hydroxyl group is bound up as a lactone and consequently does not undergo dehydration reactions as easily as the parent tetracyclines.

The invention will be described in greater detail in conjunction with the following specific examples.

*Example 1.—Preparation of 3-(4 - carbamoyl - 2,3,5 - trihydroxybenzyl) - 1,2,3,4-tetrahydro-4,8-dihydrooxy - 4-methyl-1-oxo-2-naphthoic acid, γ-lactone*

A 1.0 gram portion of tetracycline methyl betaine was suspended in 160 ml. of methanol. Nitrogen was bubbled through this suspension for 15 minutes. The suspension was then heated under a nitrogen atmosphere to the boiling point of methanol and the resulting solution was refluxed for 1½ hours. The heat was removed and the bubbling of nitrogen continued for an additional 15 minutes until all of the trimethylamine (by-product) vapors has been stripped off. The methanol was then evaporated to dryness under reduced pressure. The yellow crystalline solid was suspended in 15 ml. of heptane and filtered. It was then dried in a vacuum desiccator for about 16 hours, affording about a 60% yield of the product.

$\lambda_{max.}^{0.1\,N\,HCl} = 260\ m\mu$ [log ε 4.15], 335 mμ [log ε 3.80]

*Example 2.—Conversion of 3-(4 - carbamoyl - 2,3,5 - trihydroxybenzyl)-1,2,3,4-tetrahydro - 4,8-dihydroxy - 4-methyl-1-oxo-2-naphthoic acid, γ-lactone to 6-methyl-1,3,4,10,11,12-hexahydroxynaphthacene-2-carboxamide*

A 100 mg. portion of 3-(4-carbamoyl-2,3,5-trihydroxybenzyl)-1,2,3,4-tetrahydro-4,8-dihydroxy - 4 ‑ methyl - 1-oxo-2-naphthoic acid, γ-lactone was dissolved in 15 ml. of a solution of 30% hydrobromic acid in acetic acid. The light yellow solution was heated for 3 hours at 50–55° C. on a water bath. An orange crystalline product precipitated. The suspension was cooled to room temperature and the product was collected by filtration. The product was washed with water and dried in a vacuum desiccator for 16 hours, affording 68 mg. of product.

*Example 3.—Biological conversion of 6-methyl-1,3,4,10,11,12 ‑ hexahydroxynaphthacene ‑ 2 ‑ carboxamide to 7-chlorotetracycline*

Spores of *S. aureofaciens* NRRL 3013 were washed from an agar slant with sterile distilled water to form a suspension containing $60–80 \times 10^6$ spores per ml. A 0.33 ml. portion of this suspension was used to inoculate an 8 inch test tube containing 8 ml. of an inoculum medium prepared according to the following formulation.

| | Grams |
|---|---|
| Sucrose | 30 |
| Ammonium sulfate | 2 |
| Calcium carbonate | 7 |
| Cornsteep liquor | 20 |
| Tap water, q.s. to 1000 ml. | |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute, whereby an inoculum of *S. aureofaciens* was obtained. A fermentation medium of the following composition was prepared:

| | | |
|---|---|---|
| $(NH_2)_2SO_4$ | grams | 6.7 |
| $CaCO_3$ | do | 9.0 |
| $CoCl_2 \cdot 6H_2O$ | mg | 5.0 |
| $NH_4Cl$ | grams | 2.0 |
| $MnSO_4$ (70% Technical Grade) | do | 0.10 |
| Cornsteep liquor | do | 25.0 |
| Starch | do | 52.5 |
| Corn flour | do | 14.5 |
| Tap water, q.s. to | ml | 1000 |

After sterilization of this medium, 25 ml. portions in 250 ml. Erlenmeyer flasks were inoculated with 1.0 ml. portions of the *S. aureofaciens* NRRL 3013 inoculum. The fermentation was carried out at 28° C. for 24 hours on a rotary shaker operating at 180 revolutions per minute. At this time each mash portion was transferred to an individual flask containing a solution of 10.7 mg. of 6-methyl-1,3,4,10,11,12-hexahydroxynaphthacene-2-carboxamide in a mixture of 30 mg. of magnesium acetate and 1 ml. of dimethylsulfoxide. The fermentation was continued on the rotary shaker for an additional 96 hours at 28° C. At this time, biological assays of the mash indicated the presence of antibacterial activity corresponding to 264 micrograms of 7-chlorotetracycline per ml. This corresponds to a yield of 49% based on the compound added. The identity of the product as 7-chlorotetracycline was confirmed by paper chromatography in a butanol-pH 3 phosphate buffer system. A control flask run in exactly the same manner but with the addition of only 30 mg. of magnesium acetate and 1 ml. of dimethylsulfoxide and no 6 ‑ methyl ‑ 1,3,4,10,11,12-hexahydroxynaphthacene-2-carboxamide, showed no 7-chlorotetracycline.

*Example 4.—Preparation of 3-(4-carbamoyl-2,3,5-trihydroxybenzyl) - 1,2,3,4-tetrahydro - 4,8 - dihydroxy - 5-chloro-1-oxo-2-naphthoic acid, γ-lactone*

The 6-demethyl-7-chlorotetracycline betaine, 3 g., is suspended in 500 ml. of acetonitrile and nitrogen is bubbled through for 15 minutes. The suspension is then heated under nitrogen atmosphere to the boiling point of acetonitrile and refluxed for 4 hours. A small amount of solid does not go in solution. Heat is removed and bubbling of nitrogen is continued until most of the trimethylamine vapors are stripped off (about 10 minutes). The undissolved material is filtered. The filtrate is evaporated to dryness to afford 2.1 g. of a mixture which is purified as follows: 1.5 g. of this material is dissolved in 500 ml. of methanol. A yellow product crystallizes out within a few minutes. It is allowed to stand at room temperature for one hour and then filtered. It is washed well with ether and dried in pistol at 62° C. Yield: 381 mg. The filtrate is evaporated to dryness to afford 1.0 g. of the desired product having the following spectrum:

$\lambda_{max.}^{0.1\ N\ HCl} = 268\ m\mu$ [log ϵ 4.01], 350 m$\mu$ [log ϵ 3.62]

*Example 5.—Biological conversion of 1,3,4,10,11,12-hexahydroxynaphthacene - 2 - carboxamide to 7-chloro-6-demethyltetracycline*

Spores of *S. aureofaciens* NRRL 3013 were washed from an agar slant with sterile distilled water to form a suspension containing 60–80×10$^6$ spores per ml. A 0.33 ml. portion of this suspension was used to inoculate an 8 inch test tube containing 8 ml. of a medium prepared according to the following formulation:

| | Grams |
|---|---|
| Sucrose | 30 |
| Ammonium sulfate | 2 |
| Calcium carbonate | 7 |
| Cornsteep liquor | 20 |
| Tap water, q.s. to 1000 milliliters. | |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute, whereby an inoculum of the *S. aureofaciens* was obtained. A fermentation medium of the following composition was prepared:

| | | |
|---|---|---|
| $(NH_4)_2SO_4$ | grams | 6.7 |
| $CaCO_3$ | do | 9.0 |
| $CoCl_2 \cdot 6H_2O$ | mg | 5.0 |
| $NH_4Cl$ | grams | 2.0 |
| $MnSO_4$ (70% Technical Grade) | do | 0.10 |
| Cornsteep liquor | do | 25.0 |
| Starch | do | 52.5 |
| Corn flour | do | 14.5 |
| Tap water, q.s. to | ml | 1000 |

After sterilization of this medium in an autoclave for 20 minutes at a pressure of 15 pounds per square inch, a 25 ml. portion in a 250 ml. Erlenmeyer flask was inoculated with a 1.0 ml. portion of the *S. aureofaciens* inoculum. The fermentation was carried out at 25° C. for 24 hours on a rotary shaker operating at 180 revolutions per minute. At this time a partially fermented mash of *S. aureofaciens* NRRL 3013 was transferred to an individual flask containing a solution of 5.45 mg. of 1,3,4,10,11,12-hexahydroxynaphthacene-2-carboxamide in 30 mg. of magnesium acetate and 1 ml. of dimethylsulfoxide. The fermentation was then continued on the rotary shaker for an additional 72 hours at 28° C. At this time, analysis of the mash showed the presence of 17 micrograms per ml. of 7-chloro-6-demethyltetracycline. A control flask run in exactly the same manner but omitting the 1,3,4,10,11,12-hexahydroxynaphthacene-2-carboxamide showed no 7-chloro-6-demethyltetracycline.

*Example 6.—Preparation of 3-(4-carbamoyl-2,3,5-trihydroxybenzyl)-1,2,3,4 - tetrahydro - 4,8 - dihydroxy - 4-methyl-5-chloro-1-oxo-2-naphthoic acid, γ-lactone*

The 7-chlorotetracycline methyl betaine, 3.44 g., is suspended in 630 ml. of acetonitrile and nitrogen is bubbled through for 15 minutes. The suspension is then heated under nitrogen atmosphere to the boiling point of acetonitrile and the resulting solution is refluxed for one and a half hour. Heat is removed and bubbling of nitrogen is continued until most of trimethylamine vapors are stripped off (about 10 minutes). A small amount of solid precipitates out upon cooling which is filtered off. The filtrate is evaporated to dryness. Solid is received in 500 ml. of ether and refluxed for 30 minutes. Undissolved solid is filtered (1.713 g.). Filtrate which contains the desired products is evaporated to dryness (wt.= 1.192 g.) and purified by partition column chromatography using the system: heptane-ethyl acetate-methanol-water (80–20–17–4). The desired product has the following spectrum:

$\lambda_{max.}^{0.1\ N\ HCl} = 260\ m\mu$ [log ϵ 4.09], 352 m$\mu$ [log ϵ 3.68]

*Example 7.—Biological conversion of 7-chloro-6-methyl-1,3,4,10,11,12 - hexahydroxynaphthacene - 2 - carboxamide to 7-chlorotetracycline utilizing a non-chlorinating strain of S. aureofaciens*

Spores of non-chlorinating *S. aureofaciens* NRRL 3014 were washed from an agar slant with sterile distilled water to form a suspension containing 60–80×10$^6$ spores per ml. A 0.33 ml. portion of this suspension was used to inoculate an 8 inch test tube containing 8 ml. of a medium prepared according to the following formulation:

| | Grams |
|---|---|
| Sucrose | 30 |
| Ammonium sulfate | 2 |
| Calcium carbonate | 7 |
| Cornsteep liquor | 20 |
| Tap water, q.s. to 1000 milliliters. | |

Prior to inoculation, the medium was sterilized by autoclaving for 20 minutes under a pressure of 15 pounds per square inch. The inoculated tube was then incubated for 24 hours at 28° C. on a reciprocating shaker operating at 116 oscillations per minute, whereby an inoculum of the *S. aureofaciens* was obtained. A fermentation medium of the following composition was prepared.

| | | |
|---|---|---|
| $(NH_4)_4SO_4$ | grams | 6.7 |
| $CaCO_3$ | do | 9.0 |
| $CoCl_2 \cdot 6H_2O$ | mg | 5.0 |
| $NH_4Cl$ | grams | 2.0 |
| $MnSO_4$ (70% Technical Grade) | do | 0.10 |
| Cornsteep liquor | do | 25.0 |
| Starch | do | 52.5 |
| Corn flour | do | 14.5 |
| Tap Water, q.s. to | ml | 1000 |

After sterilization of this medium in an autoclave for 20 minutes at a pressure of 15 pounds per square inch, 25 ml. portions in 250 ml. Erlenmeyer flasks were inoculated with 1.0 ml. portions of the *S. aureofaciens* inoculum. The fermentation was carried out at 25° C. for 24 hours on a rotary shaker operating at 180 revolutions per minute. At this time each mash portion was transferred to an individual flask containing a solution of 10 mg. of 7 - chloro - 6 - methyl - 1,3,4,10,11,12 - hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time analysis of the mash showed the presence of 10 micrograms per ml. of 7-chlorotetracycline. A control flask run in exactly the same manner but omitting the 7-chloro-6-methyl - 1,3,4,10,11,12 - hexahydroxynaphthacene - 2-carboxamide showed no 7-chlorotetracycline.

*Example 8.—Biological conversion of 7-chloro-1,3,4,10, 11,12 - hexahydroxynaphthacene - 2-carboxamide to 7-chloro-6-demethyltetracycline utilizing a non-chlorinating strain of S. aureofaciens*

The procedure of Example 7 was followed with these exceptions: The partially fermented (24 hours) mash was transferred to flasks containing a solution of 10 mg. of 7 - chloro-1,3,4,10,11,12-hexahydroxynaphacene-2-carboxamide in a mixture of 10 mg. of magnesium acetate and 1 ml. of dimethylsulfoxide. The fermentation was then continued on the rotary shaker for an additional 96 hours at 28° C. At this time, analysis of the mash showed the presence of 9 micrograms per ml. of 7-chloro-6-demethyltetracycline. A control flask run in exactly the same manner but omitting the 7-chloro-1,3,4,10,11,12- hexahydroxynaphthacene-2-carboxamide showed no 7-chloro-6-demethyltetracycline.

*Example 9.—Biological conversion of 7-chloro-6-methyl-1,3,4,10,11,12 - hexahydroxynaphthacene - 2 - carboxamide to 7-chlorotetracycline utilizing a chlorinating strain of S. aureofaciens*

The procedure of Example 7 was followed with these exceptions: Spores of chlorinating *S. aureofaciens* NRRL 3013 were washed from an agar slant with sterile distilled water to form a suspension containing $60-80 \times 10^6$ spores per ml. A 0.33 ml. portion of this suspension was used to inoculate an 8 inch test tube containing 8 ml. of the medium described in Example 7. The partially fermented (24 hours) mash (prepared as in Example 7) was transferred to flasks containing a solution of 10 mg. of 7-chloro - 6 - methyl - 1,3,4,10,11,12 - hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time, analysis of the mash showed the presence of 10 micrograms per ml. of 7-chlorotetracycline. A control flask run in exactly the same manner but omitting the 7-chloro-6-methyl-1,3,4,10,11,12-hexahydroxynaphthacene-2-carboxamide showed no 7-chlorotetracycline.

*Example 10—Biological conversion of 7-chloro-1,3,4,10,11,12 - hexahydroxynaphthacene - 2-carboxamide to 7-chloro-6-demethyltetracycline utilizing a chlorinating strain of S. aureofaciens*

The procedure of Example 9 was followed with these exceptions: The partially fermented (24 hours) mash was transferred to flasks containing a solution of 10 mg. of 7 - chloro - 1,3,4,10,11,12-hexahydroxynaphthacene-2-carboxamide in a mixture of 10 mg. of magnesium acetate and 1 ml. of dimethylsulfoxide. The fermentation was then continued on the rotary shaker for an additional 96 hours at 28° C. At this time analysis of the mash showed the presence of 9 micrograms per ml. of 7-chloro-6-demethyltetracycline. A control flask run in exactly the same manner but omitting the 7-chloro-1,3,4,10,11,12-hexahydroxynaphthacene - 2 - carboxamide showed no 7-chloro-6-demethyltetracycline.

What is claimed is:

1. A compound of the formula:

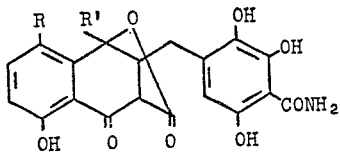

wherein R is selected from the group consisting of hydrogen, chlorine, bromine and nitro and R' is selected from the group consisting of hydrogen and methyl.

2. 3 - (4 - carbamoyl - 2,3,5 - trihydroxybenzyl) - 1,2,3,4 - tetrahydro - 4,8 - dihydroxy - 1 - oxo - 2 - naphthoic acid, γ-lactone.

3. 5 - chloro - 3 - (4 - carbamoyl - 2,3,5 - trihydroxybenzyl) - 1,2,3,4 - tetrahydro - 4,8 - dihydroxy - 1 - oxo-2-naphthoic acid, γ-lactone.

4. 5 - bromo - 3 - (4 - carbamoyl - 2,3,5 - trihydroxybenzyl) - 1,2,3,4 - tetrahydro - 4,8 - dihydroxy - 1 - oxo-2-naphthoic acid, γ-lactone.

5. 5 - nitro - 3 - (4 - carbamoyl - 2,3,5 - trihydroxybenzyl) - 1,2,3,4 - tetrahydro - 4,8 - dihydroxy - 1 - oxo-2-naphthoic acid, γ-lactone.

6. 4 - methyl - 3 - (4 - carbamoyl - 2,3,5 - trihydroxybenzyl) - 1,2,3,4 - tetrahydro - 4,8 - dihydroxy - 1 - oxo-2-naphthoic acid, γ-lactone.

7. 5 - chloro - 4 - methyl - 3 - (4 - carbamoyl - 2,3,5-trihydroxybenzyl) - 1,2,3,4 - tetrahydro - 4,8 - dihydroxy-1-oxo-2-naphthoic acid, γ-lactone.

8. 5 - bromo - 4 - methyl - 3 - (4 - carbamoyl - 2,3,5-trihydroxybenzyl) - 1,2,3,4 - tetrahydro - 4,8 - dihydroxy-1-oxo-2-naphthoic acid, γ-lactone.

9. 5 - nitro - 4 - methyl - 3 - (4 - carbamoyl - 2,3,5-trihydroxybenzyl) - 1,2,3,4 - tetrahydro - 4,8 - dihydroxy-1-oxo-2-naphthoic acid, γ-lactone.

10. The process of preparing compounds of the formula:

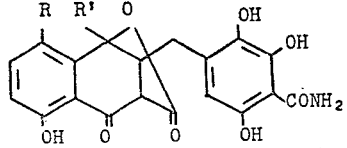

wherein R is selected from the group consisting of hydrogen, chlorine, bromine and nitro and R' is selected from the group consisting of hydrogen and methyl, which comprises refluxing a compound of the formula:

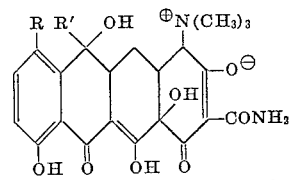

wherein R and R' are as hereinabove defined, in a solvent selected from the group consisting of acetonitrile and methanol under an inert atmosphere.

11. The process of preparing compounds of the formula:

wherein R is selected from the group consisting of hydrogen, chlorine, bromine, and nitro and R' is selected from the group consisting of hydrogen and methyl, which comprises refluxing a compound of the formula:

wherein R and R' are as hereinabove defined, in a strong mineral acid.

12. The process of preparing compounds of the formula:

wherein R is selected from the group consisting of hydrogen, chlorine, bromine and nitro and R' is selected from the group consisting of hydrogen and methyl, which comprises dissolving a compound of the formula:

wherein R and R' are as hereinabove defined, in a strong mineral acid.

No references cited.

NICHOLAS S. RIZZO, *Primary Examiner.*